(12) United States Patent
Paul

(10) Patent No.: US 10,123,921 B2
(45) Date of Patent: Nov. 13, 2018

(54) PATIENT SUPPORT APPARATUS

(71) Applicant: Stryker Corporation, Kalamazoo, MI (US)

(72) Inventor: Anish Paul, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 59 days.

(21) Appl. No.: 15/201,747

(22) Filed: Jul. 5, 2016

(65) Prior Publication Data

US 2017/0020755 A1    Jan. 26, 2017

Related U.S. Application Data

(60) Provisional application No. 62/196,400, filed on Jul. 24, 2015.

(51) Int. Cl.
*A61G 7/10* (2006.01)
*B62D 61/12* (2006.01)
(Continued)

(52) U.S. Cl.
CPC ............ *A61G 5/06* (2013.01); *A61G 7/012* (2013.01); *A61G 7/05* (2013.01); *A61G 7/0528* (2016.11); *A61G 7/1048* (2013.01); *B60B 33/066* (2013.01); *B62B 3/008* (2013.01); *B62D 61/12* (2013.01); *B60B 33/006* (2013.01); *B60B 33/0063* (2013.01); *B60B 2200/242* (2013.01); *B60B 2900/3312* (2013.01);
(Continued)

(58) Field of Classification Search
CPC .......... B62B 3/008; B62D 61/12; A61G 5/04; A61G 5/06; A61G 5/061; A61G 7/1048; A61G 7/05

See application file for complete search history.

(56) References Cited

U.S. PATENT DOCUMENTS 3,544,127 A * 12/1970 Dobson ..................... B60S 9/14
280/43.17
4,128,137 A * 12/1978 Booth ..................... A61G 5/043
180/6.5
(Continued)

FOREIGN PATENT DOCUMENTS

WO      2005041837 A2    5/2005
WO      2009113009 A1    9/2009

*Primary Examiner* — Joseph M Rocca
*Assistant Examiner* — Maurice L Williams
(74) *Attorney, Agent, or Firm* — Warner Norcross + Judd LLP

(57) ABSTRACT

A patient support apparatus includes a base having a length and including a plurality of caster wheels enabling movement of the patient support apparatus across a floor surface. An auxiliary wheel support structure is secured to the base and rotatably supports at least one non-castered auxiliary wheel about a rotational axis transverse to the length of the base for engagement with the floor surface. The auxiliary wheel support structure may be configured to support the auxiliary wheel and to enable movement of the auxiliary wheel out of engagement with the floor surface to a non-engaged position wherein the at least one auxiliary wheel is out of engagement with the floor surface. A control apparatus is in communication with and moves the at least one auxiliary wheel between at least one deployed position and a non-engaged position.

19 Claims, 5 Drawing Sheets

(51) Int. Cl.
*A61G 5/06* (2006.01)
*A61G 7/05* (2006.01)
*B62B 3/00* (2006.01)
*A61G 7/012* (2006.01)
*B60B 33/06* (2006.01)
*B62B 5/00* (2006.01)
*B60B 33/00* (2006.01)

(52) U.S. Cl.
CPC ....... *B60B 2900/721* (2013.01); *B62B 5/0043* (2013.01); *B62B 2301/10* (2013.01)

(56) References Cited

U.S. PATENT DOCUMENTS

| | | | | |
|---|---|---|---|---|
| 5,201,819 A * | 4/1993 | Shiraishi | | B60G 5/00 180/168 |
| 5,348,326 A * | 9/1994 | Fullenkamp | | A61G 7/00 280/43 |
| 5,937,959 A * | 8/1999 | Fujii | | A61G 5/047 180/12 |
| 5,964,473 A * | 10/1999 | Degonda | | A61G 5/043 180/907 |
| 6,000,486 A * | 12/1999 | Romick | | B62B 3/008 180/209 |
| 6,240,579 B1 * | 6/2001 | Hanson | | A61G 7/012 280/43.17 |
| 6,253,397 B1 * | 7/2001 | Bartow | | A61G 7/00 5/425 |
| 6,588,523 B2 | 7/2003 | Heimbrock et al. | | |
| 6,598,247 B1 * | 7/2003 | Heimbrock | | A61G 7/08 296/20 |
| 6,725,956 B1 * | 4/2004 | Lemire | | A61G 7/08 180/15 |
| 6,752,224 B2 | 6/2004 | Hopper | | A61G 7/08 180/19.1 |
| 6,772,850 B1 * | 8/2004 | Waters | | A61G 7/08 180/65.51 |
| 6,792,630 B1 | 9/2004 | Palmatier et al. | | |
| 6,834,402 B2 | 12/2004 | Hanson et al. | | |
| 7,007,765 B2 | 3/2006 | Waters et al. | | |
| 7,083,012 B2 | 8/2006 | Vogel et al. | | |
| 7,090,041 B2 | 8/2006 | Vogel et al. | | |
| 7,090,042 B2 * | 8/2006 | Coveyou | | B62D 51/04 180/19.2 |
| 7,191,854 B2 * | 3/2007 | Lenkman | | A61G 7/08 180/19.1 |
| 7,530,412 B2 | 5/2009 | Heimbrock et al. | | |
| 7,828,092 B2 | 11/2010 | Vogel et al. | | |
| 8,752,659 B1 * | 6/2014 | Lenkman | | B60G 17/0526 180/19.1 |
| 8,781,677 B2 * | 7/2014 | Roberts | | A61G 1/0268 280/250.1 |
| 8,789,662 B2 * | 7/2014 | Childs | | B60B 33/0081 16/35 R |
| 9,358,169 B2 * | 6/2016 | Ottenweller | | A61G 7/08 |
| 2002/0124764 A1 * | 9/2002 | Coveyou | | B62D 53/005 104/137 |
| 2003/0192726 A1 * | 10/2003 | Chu | | B60K 1/00 180/65.51 |
| 2004/0150204 A1 * | 8/2004 | Goertzen | | A61G 5/043 280/755 |
| 2005/0034903 A1 * | 2/2005 | Wu | | A61G 5/042 180/65.1 |
| 2005/0151360 A1 * | 7/2005 | Bertrand | | A61G 5/043 280/755 |
| 2007/0107955 A1 * | 5/2007 | Puskar-Pasewicz | | A61G 5/042 180/65.1 |
| 2008/0087481 A1 * | 4/2008 | Grymko | | A61G 5/042 180/68.5 |
| 2008/0141459 A1 | 6/2008 | Hamberg et al. | | |
| 2009/0014219 A1 * | 1/2009 | Springston | | B62B 3/008 180/19.1 |
| 2009/0218150 A1 | 9/2009 | Heimbrock et al. | | |
| 2011/0035883 A1 | 2/2011 | Vogel et al. | | |
| 2013/0008732 A1 | 1/2013 | Richter | | |
| 2015/0014959 A1 * | 1/2015 | Youngmann | | A61G 5/006 280/400 |

* cited by examiner

PATIENT SUPPORT APPARATUS

This application claims the benefit of U.S. provisional patent application Ser. No. 62/196,400 filed Jul. 24, 2015, by inventor Anish Paul and entitled PATIENT SUPPORT APPARATUS, the disclosure of which is incorporated herein by reference in its entirety.

TECHNICAL FIELD AND BACKGROUND

Summary

The present disclosure relates to a patient support apparatus for supporting a patient, and, more particularly, to a patient support apparatus having a suspension system cooperating with at least one auxiliary wheel to selectively position the wheel relative to the patient support apparatus and maintain contact with a floor surface.

Patient support apparatuses for supporting a patient are well known in the art. Many patient support apparatuses include a fifth wheel which can be raised and lowered by manually manipulating a wheel support frame oriented beneath the patient supporting portion of the patient support apparatus. The fifth wheel is positioned at substantially the center of the patient support apparatus such that usually the rear castered wheels and the fifth wheel engage the floor surface and support the patient support apparatus while the front castered wheels are raised when the fifth wheel is deployed.

In use on an uneven floor surface, the fifth wheel arrangement can temporarily be in an extended position, but out of contact with the floor. For example, if a patient support apparatus begins movement up a ramp, the change in grade of the floor surface can cause the extended fifth wheel to lift from the floor. Ensuring contact of the caster wheels and auxiliary wheel increases the control of the patient support apparatus and improves steering function of the auxiliary wheel on sloped or transitioning floor surfaces. Therefore, there is a need to provide a patient support apparatus which overcomes the limitations of the prior art.

In one embodiment, a patient support apparatus for supporting a patient having an arrangement so that at least one driven auxiliary wheel, when in the extended position, maintains contact with the floor surface even if the floor surface is uneven or has a lower surface. The patient support apparatus includes a base and a plurality of caster wheels spaced apart from one another enabling movement of the patient support apparatus across a floor surface.

An auxiliary wheel support structure is secured to the base and rotatably supports at least one non-castered auxiliary wheel about a rotational axis transverse to the length of the base for engagement with the floor surface. The support structure of the patient support apparatus enables movement of the at least one auxiliary wheel from at least one deployed position in engagement with the floor surface to a non-engaged position wherein the at least one auxiliary wheel is out of engagement with the floor surface.

The patient support apparatus includes a control apparatus controlling the auxiliary wheel support structure to move the at least one auxiliary wheel between at least a first deployed position engaging the floor surface and a second stored position out of engagement with the floor surface. The control apparatus cooperates with the auxiliary wheel support structure to ensure each of the caster wheels and the at least one auxiliary wheel are all in contact with the floor surface during movement of the patient support apparatus. When the auxiliary wheels are positioned on an uneven floor surface, the auxiliary wheel support structure enables the auxiliary wheels to maintain contact with the floor surface.

In another embodiment of the disclosure, the plurality of casters provided with the patient support apparatus includes four caster wheels spaced from one another on the base that engage the floor surface. Each caster wheel may include a brake positionable to stop movement of each wheel.

In yet another embodiment of the present disclosure, the at least one auxiliary wheel includes a brake associated with the wheel to stop movement of the wheel. A drive mechanism cooperating with a motor may be configured to drive the at least one auxiliary wheel.

Another embodiment of the patient support apparatus comprises the auxiliary wheel being associated with at least one associated caster wheel of the plurality of caster wheels and supported for movement relative to the base to accommodate a changing terrain of the floor surface such that the auxiliary wheel and its associated caster wheel maintain contact with and follow the changing terrain of the floor surface. The auxiliary wheel and its associated caster wheel are commonly mounted on the auxiliary wheel support structure and are configured to move relative to the base when the auxiliary wheel or its associated caster wheel encounters the change in terrain.

In another embodiment of the present disclosure, the plurality of caster wheels include a head end caster wheel and a foot end caster wheel, each caster wheel having a caster wheel rotational axis and a swivel axis, and the auxiliary wheel being located between the axes of rotation of the head end caster wheel and the foot end caster wheel. The plurality of caster wheels axes of rotation and swivel axes defining a foot print, and the auxiliary wheel being located outside the foot print.

In yet another embodiment of the present disclosure, the at least one auxiliary wheel of the patient support apparatus is located outside the foot print beyond the caster wheel rotational axis of the head end caster wheel or the foot end caster wheel.

Another embodiment of the patient support apparatus of the present disclosure includes the at least one auxiliary wheel comprising a first auxiliary wheel and a second auxiliary wheel, the second auxiliary wheel being parallel to the first auxiliary wheel and being rotatable about the rotational axis. When the patient support apparatus engages a floor surface, each of the caster wheels and the first and second auxiliary wheels are all in contact with the floor surface. In a non-engaged position, each of the plurality of caster wheels is in contact with the floor surface and the first and second auxiliary wheels are out of contact with the floor surface. When the auxiliary wheel is associated with at least one associated caster wheel of the plurality of caster wheels and engaged with the floor surface, the auxiliary wheel may apply a pressure to the floor surface equal to or greater than the pressure applied to the floor surface by its associate caster wheel.

In another embodiment of the present disclosure, the at least one auxiliary wheel and its associated caster wheel are commonly mounted on the auxiliary wheel support structure. The auxiliary wheel support structure may be mounted to the base by an articulating mount such that the auxiliary wheel is supported at a distance R1 from the articulating mount and its associated caster wheel at a distance R2 from the articulating mount wherein R1 is equal to R2. Alternatively, the distance R1 is greater than R2, or less than R2.

In yet another embodiment of the present disclosure, the at least one auxiliary wheel of the patient support apparatus is mounted to the base independently of each of the caster wheels. An actuator may be provided to raise the at least one auxiliary wheel from a deployed position to a non-engaged position. The actuator may comprise a manually operable actuator or a cam driver for raising the auxiliary wheel such that the actuator raises the auxiliary wheel a distance in a range of 0 to 150 mm above the floor surface when the auxiliary wheel is moved to its non-engaged position.

Another embodiment of the patient support apparatus of the present disclosure may include a control apparatus for moving the at least one auxiliary wheel. The control apparatus includes at least one manipulative member coupled to the auxiliary wheel support structure, the manipulative member being movable between at least two positions, one of the positions corresponding to when the auxiliary wheel is engaged with the floor surface and the other position corresponding to when the auxiliary wheel is in the deployed position. It is contemplated that the auxiliary wheel support structure may also include a damper to absorb movement of the auxiliary wheel when the auxiliary wheel encounters variation in terrain of the floor surface.

In yet another embodiment of the patient support apparatus of the present disclosure, a method of controlling the motion of a patient support apparatus across a floor surface having a base with a plurality of caster wheels and at least one non-castered auxiliary wheel movably mounted to the base includes the step of engaging the floor surface with the caster wheels and the auxiliary wheel. The patient support apparatus is moved across the floor surface on the caster wheels and the auxiliary wheel. The auxiliary wheel is raised when maneuvering the patient support apparatus in a non-linear path across the floor surface.

In another embodiment of the present disclosure, the method of controlling the motion of a patient support apparatus further comprises associating the auxiliary wheel with at least one of the caster wheels, and applying a greater pressure with the auxiliary wheel than with the associated caster wheel. The auxiliary wheel and the associated caster wheel are supported on a common support structure.

In yet another embodiment of the patient support apparatus, the at least one auxiliary wheel may be driven by a motor or the like to position the patient support apparatus and a braking mechanism may cooperate with the at least one auxiliary wheel to stop the motion of the patient support apparatus.

DETAILED DESCRIPTION

Figure 1:
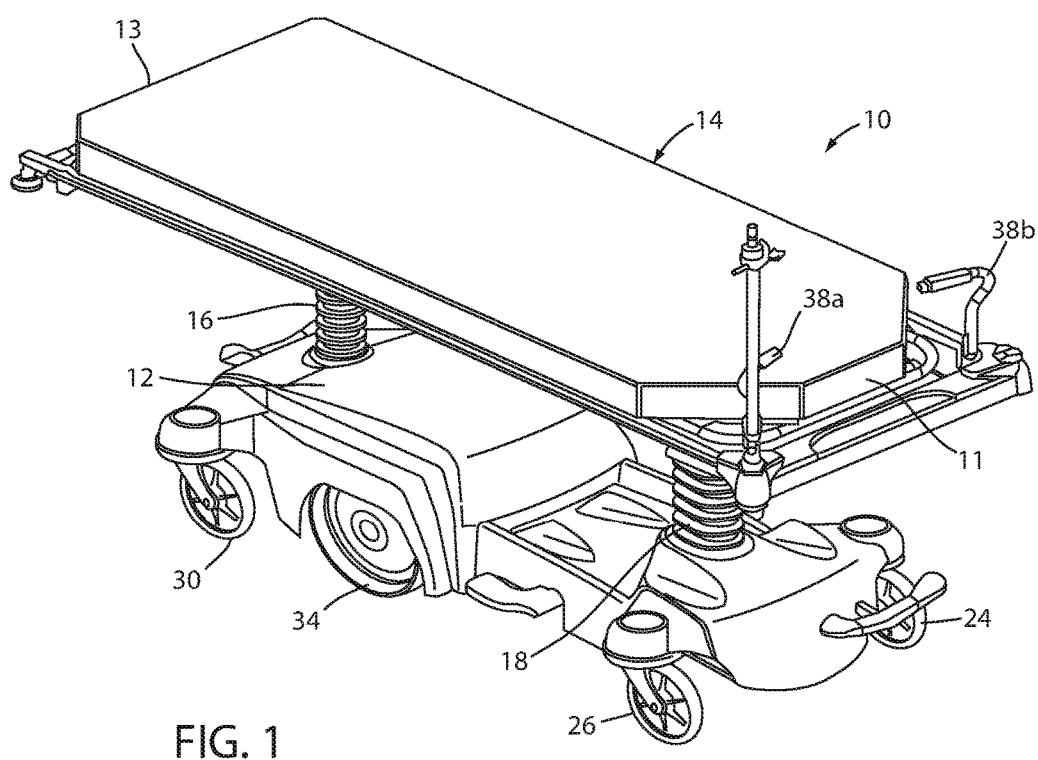
FIG. 1 is an isometric view of a patient support apparatus for supporting a patient in a substantially horizontal position.

As required, detailed embodiments of the present disclosure are disclosed herein; however, it is to be understood that the disclosed embodiments are merely exemplary and that various and alternative forms may be employed. The embodiments are included in order to explain principles of the disclosure and not to limit the scope thereof, which is defined by the appended claims. Features from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

With references to the Figures, a more detailed description of embodiments of a patient support apparatus will be described. For ease of illustration and to facilitate understanding, throughout the following description similar reference numerals have been used to denote similar elements, parts, items or features in the drawings, where applicable.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the patient support apparatus and designated parts thereof. Such terminology will include derivatives and words of similar importance.

Figure 2:
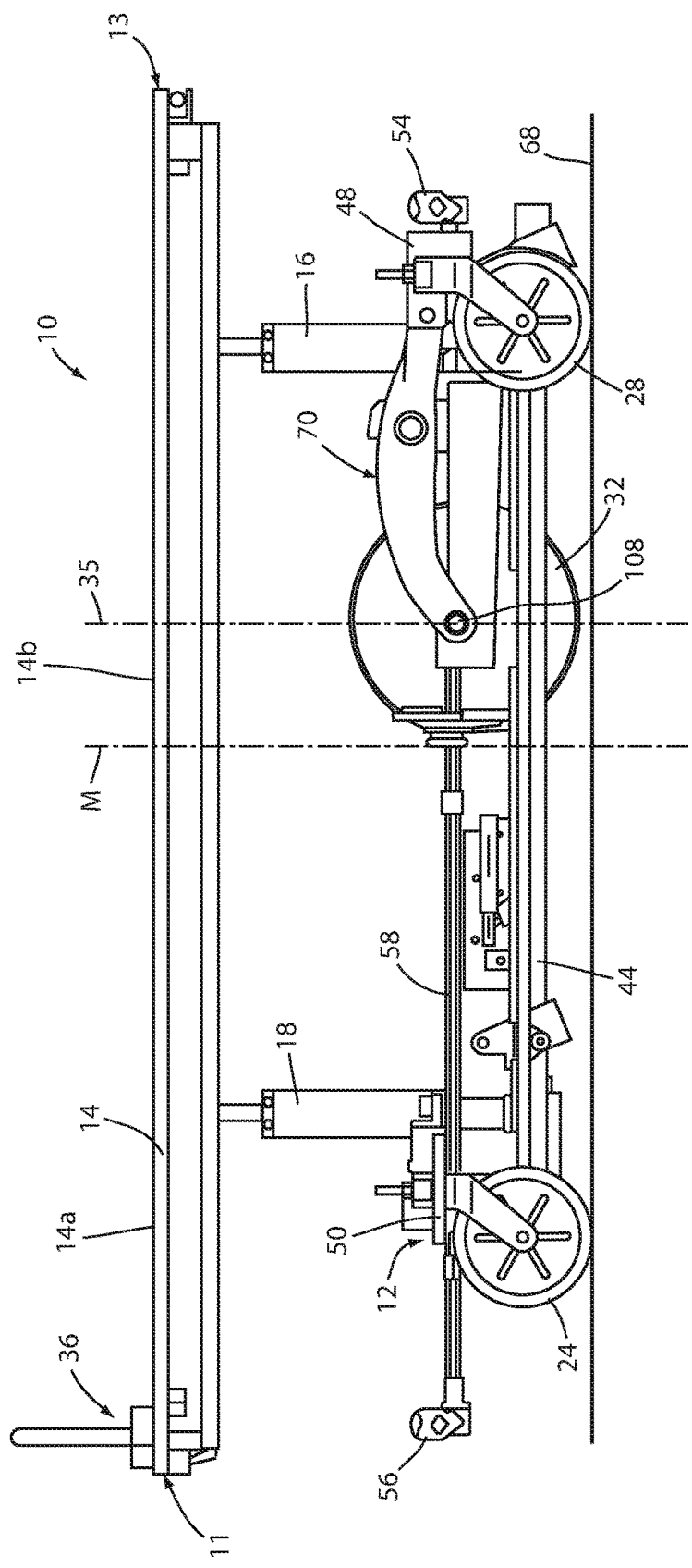
FIG. 2 is a side view of a the patient support apparatus for supporting a patient in a substantially horizontal position.

Referring to FIG. 1, a patient support apparatus 10 for supporting a patient. Patient support apparatus 10 may comprise a stretcher, a hospital bed, a chair, such as a wheel chair or medical recliner chair, or a cot. The patient support apparatus 10 includes a wheeled base 12 and patient support 14, which may include at least a back section 14*a* and a seat section 14*b* (FIG. 2). Optionally, patient support 14 includes a back section pivotally joined with the seat section to form an articulating patient support deck. Optionally, depending on the form of the apparatus, apparatus 10 may also include an elevation system operatively coupled to the base configured to raise and lower the patient support relative to the base.

In one embodiment of the present disclosure, the patient elevation system includes a pair of actuators, such as hydraulically operated jacks 16 and 18. Examples of suitable jacks are disclosed in U.S. Pat. No. 6,752,224, which is commonly owned by Stryker Corporation of Kalamazoo and which is incorporated by reference in its entirety herein.

For the purpose of this description, patient support apparatus may be defined to include a head end 11 and an opposing foot end 13 defining the ends of the patient support apparatus 10 at which a user's feet may be positioned, and right and left sides joining these ends. The hydraulic jacks 16 and 18 are mounted to a wheeled base 12 and provide height adjustment to patient support 14.

As shown additionally in FIG. 2, the base 12 may be formed from spaced apart first and second elongate base frame members 44 that extend along the length of the patient support apparatus 10, which support a plurality of castered wheels 24, 26, 28, and 30. Base 12 may include a pair of elongate base support beams 48, 50 that are supported by frame members 44 and which provide a mount for castered wheels 24, 26, 28, and 30.

In one embodiment of the present disclosure, the castered wheels 24, 26, 28, and 30 each cooperate with a braking mechanism and are supported at each of the four corners of the base 12. One example of a suitable braking system is disclosed in detail in U.S. Pat. No. 7,690,059 issued Apr. 10, 2010 and titled HOSPITAL BED, the disclosure of which is hereby incorporated by reference herein in its entirety.

Further, patient support apparatus 10 includes one or more non-castered auxiliary wheels 32, 34 that are also supported by frame members 44, as will be more fully described below. Further, the caster wheel axes of rotation and swivel axes defining a foot print. The at least one auxiliary wheel may be located inside or outside the foot print of the caster wheels axes of rotation of the head end caster wheel and/or or the foot end caster wheels.

Wheels 32, 34 may be powered or non-powered wheels to facilitate movement of the patient support apparatus. In one embodiment of the present disclosure, the powered version of the auxiliary wheels may be controlled by the ZOOM drive system, sold by Stryker Corporation and which is described in U.S. Pat. Nos. 6,772,850 and 7,007,765, which are commonly owned by Stryker Corporation of Kalamazoo and which are incorporated by reference in their entireties herein.

In one of the embodiments, patient support apparatus 10 includes a pair of auxiliary wheels 32, 34 longitudinally spaced a distance from the center of gravity along the length of the patient support apparatus 10 and laterally spaced from the longitudinal axis of the patient support apparatus. As shown in FIG. 2, the base 12 has a transverse centerline M located at a midpoint of the length of the base and dividing the base. The rotational axis 35 of the auxiliary wheels may be spaced from the centerline M of the base 12 toward the foot end 13 of the base.

Optionally, one or more brake members may be provided adjacent one or both of the auxiliary wheels to assist in the control of the patient support apparatus during transport. Suitable brake members for use with the patient support apparatus are disclosed in copending U.S. Patent Application No. 62/196,396, filed Jul. 24, 2015 and entitled SYSTEM AND METHOD OF BRAKING FOR A PATIENT SUPPORT APPARATUS, which is commonly owned by Stryker Corporation of Kalamazoo and which is incorporated by reference in its entirety herein.

As noted above, patient support apparatus 10 may be supported by castered wheels 24, 26 at the head end 11, and castered wheels 28, 30 at the foot end 13 of the patient support apparatus to prevent teetering of the patient support apparatus 10. A balanced patient support apparatus ensures the patient is comfortable while occupying the apparatus and preventing teetering enables proper cardio-pulmonary resuscitation of the patient. Each caster wheel includes a caster wheel rotational axis and a swivel axis. The at least one auxiliary wheel may be located between the axes of rotation of the head end caster wheel and the foot end caster wheel of the patient support apparatus.

Figure 3:
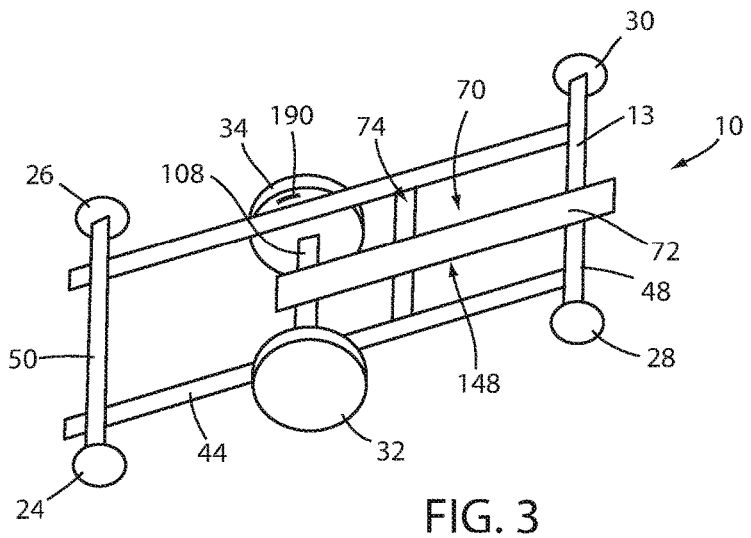
FIG. 3 is an isometric view of the patient support apparatus with the patient support removed to illustrate elements of the at least one auxiliary wheel support structure.

Referring now to FIG. 3, in the illustrated embodiment, the auxiliary wheels and its associated caster wheel or wheels are commonly mounted on an auxiliary wheel support structure 70. The auxiliary wheel support structure 70 comprises a beam 72 that is mounted to wheeled base 12 by an articulating mount 74. Mount 74 allows the ends of the beam (and hence e.g. wheels 32, 34 and 28, 30) to pivot about a horizontal axis so that when apparatus 10 is driven over a transition, such as between a slope and a horizontal plane, over thresholds, or other floor variations, both the auxiliary wheel(s) and its associated castered wheel(s) will maintain contact with the floor.

The auxiliary wheel can be mounted to beam 72 at the same distance from the articulating mount as its associated caster wheel or wheels or at a distance greater or less than its associated castered wheel, which will vary the pressure applied to the floor by the respective wheels. Further, beam 72 may be configured as a suspension beam 148, such as walking beam suspension, which is configured to maintain the at least one auxiliary wheel and all of the plurality of casters engaged with the floor surface when the at least one auxiliary wheel is in the deployed position. It is understood that support structure 70 may be provided at the head end or foot end of the patient support apparatus. For purposes of this application, the support structure 70 is illustrated at the foot end of the patient support apparatus.

Referring to FIGS. 4A-4D, suspension beam 148, which forms beam 72, is pivotally supported at an intermediate pivot axis 152 to the wheeled base 12. In one embodiment, pivot axis 152 of suspension beam 148 may be orthogonal to the patient support apparatus longitudinal center line and parallel to the head and foot caster wheel axes 154, 156. A first end 158 of the suspension beam 148 may be connected to a caster wheel 28 associated with the foot end of patient support apparatus, while a second end 160 of the suspension member is connected to the drive axle 108 of auxiliary wheels 32, 34.

Referring again to FIGS. 4A-4D, one embodiment of the suspension arrangement for the auxiliary wheel support structure is described in greater detail. As shown in the Figures, auxiliary wheel support structure 70 includes a suspension arrangement extending between one or more caster wheels and at least one auxiliary wheel. It is understood that in one embodiment of the present disclosure, the suspension arrangement may include a pair of side by side suspension beams receiving and supporting a drive axle interconnected to the at least one auxiliary wheel and one or more caster wheels at an opposing end. It is understood that the suspension arrangement may include multiple suspension beams to accomplish the same or similar objective.

As noted above, the auxiliary wheel support structure ensures the at least one auxiliary wheel contacts the floor surface even when the floor surface may be uneven. The support structure 70 enables contact of the auxiliary wheels 32, 34 with the floor surface 68 even in circumstances where the floor surface at the auxiliary wheels is lowered a significant distance relative to the floor surface at the castered wheels 24, 26, 28, and 30 while ensuring that all caster wheels 24, 26, 28, and 30 remain in contact with the floor surface 68.

Figure 6:
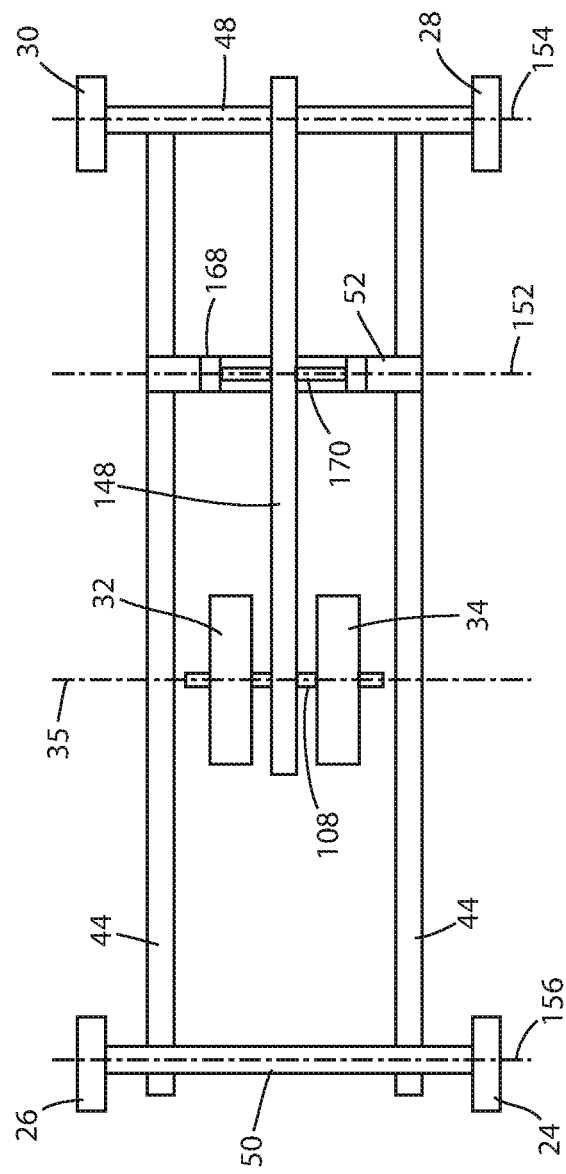
FIG. 6 is a plan view of the suspension mechanism of FIG. 5.

Referring to FIG. 6, suspension beam 148 may be mounted to the base 12 of patient support apparatus 10 by a shaft 170 that is supported by a support bracket 164. The bracket may be supported by a transverse member 52 that extend between base frame members 44 to thereby mount beam 148 to base 12. In one embodiment, a shaft bearing member may be secured to the support bracket 164 to receive shaft 170. Shaft 170 is mounted to suspension beam 148 at the intermediate pivot axis 152 and extends in a plane parallel to the head and foot caster wheel rotational axes as well as the rotational axis of the at least one auxiliary wheel.

Figure 5:
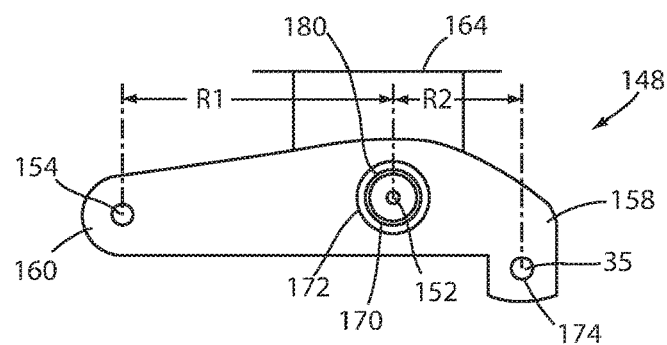
FIG. 5 is a side view of one embodiment of the suspension mechanism of the auxiliary wheel support structure of the patient support apparatus.

Suspension beam 148 may be rotatably mounted about shaft 170 so that beam 148 may articulate about pivot axis 152, which forms part of the articulating mount 74. For example, as shown in FIG. 5, shaft 170 may extend through an opening in beam 148 and be supported therein by a hub as noted below. Drive wheel axle 108 is received in and extends through an opening 174 in the first end 158 of the suspension beam 148. Drive wheel axle 108 rotates about an auxiliary wheel rotational axis 35 and is disposed opposite caster wheel rotational axis 154 provided adjacent the second end 160 of suspension beam 148.

A hub 180 may extend around the shaft 170 and within the aperture 172. A biasing mechanism (not shown), such as a leaf spring or the like, may be secured on the hub 180. It is contemplated that the biasing mechanism may be received and secured to suspension beam 148 in mounting portions disposed on the suspension beam 148.

Figure 4A:
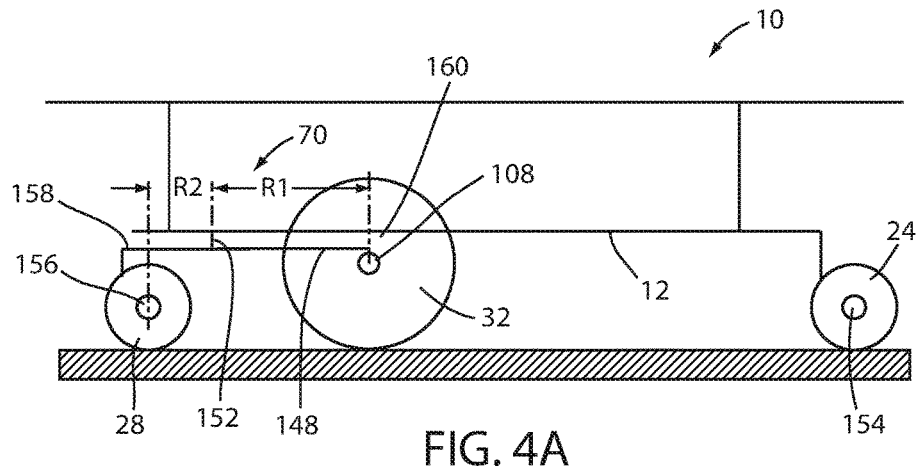
FIG. 4A is a side view of another embodiment of an auxiliary wheel support structure for the patient support apparatus illustrating the relationship between the auxiliary wheels and the floor surface in various positions.

In one embodiment of the patient support apparatus, the auxiliary wheel and associated caster wheel are supported by beam 148 at opposed ends of beam 148. Further, the auxiliary wheel and associated caster wheel are each spaced from pivot axis 152 either the same distance or at different distances to improve the function of the suspension mechanism. As is shown in FIG. 4A, rotational axis 35 of auxiliary wheel 32 is positioned on the suspension beam 148 a distance R1 from the pivot axis 152 of the suspension beam. Conversely, rotational axis 154 of caster wheel 28 is positioned on suspension beam 148 a distance R2 from the pivot axis 152. In one embodiment, the distances R1 and R2 are equal. In yet another embodiment of the present disclosure, the distance R1 between rotational axis 35 of auxiliary wheel 32 and pivot axis 152 is greater or less than the distance R2 between the rotational axis 35 of caster wheel 28 and pivot axis 152. It is understood that the distances R1 and R2 could be adjusted in a variety of ways to achieve different results for different applications for the patient support apparatus.

In operation, when the at least one auxiliary wheel 32 is placed in a deployed position, the auxiliary wheel or wheels 32, 34, and caster wheels 24, 26, 28, and 30 are all positioned so that they engage the floor such as shown in FIG. 4A. Further, as the apparatus is pushed across a floor surface, the auxiliary wheel or wheels and its associated castered wheel or wheels will stay in contact with the floor surface even when encountering an uneven terrain or a change in the terrain. However, when a lateral motion is desired, it may be desirable to lift the auxiliary wheel or wheels to a non-engaged position. In a non-engaged position shown in FIG. 4B, the auxiliary wheel 32 can be raised from the floor surface 68 by pivoting the suspension beam 148 about pivot axis 152 such that the plurality of caster wheels (24 and 28 in the Figures) are the only wheels contacting the floor surface.

Figure 4B:
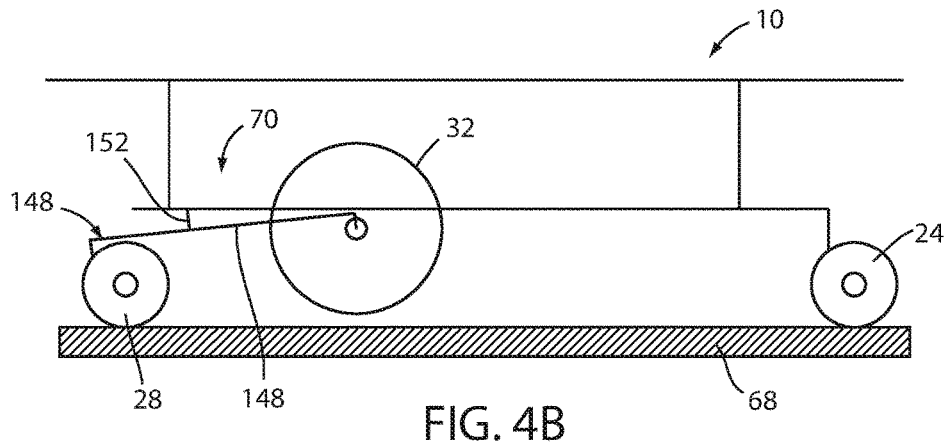
FIG. 4B is a side view of another embodiment of an auxiliary wheel support structure for the patient support apparatus illustrating the relationship between the auxiliary wheels and the floor surface in various positions.
Figure 4C:
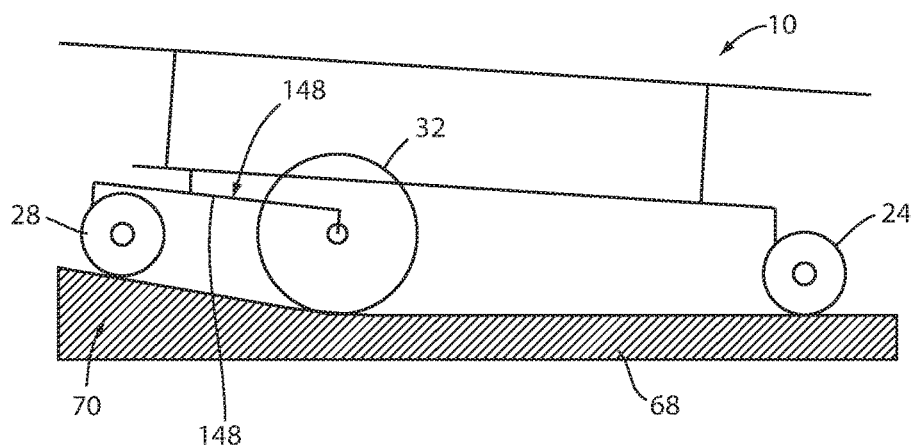
FIG. 4C is a side view of another embodiment of an auxiliary wheel support structure for the patient support apparatus illustrating the relationship between the auxiliary wheels and the floor surface in various positions.
Figure 4D:
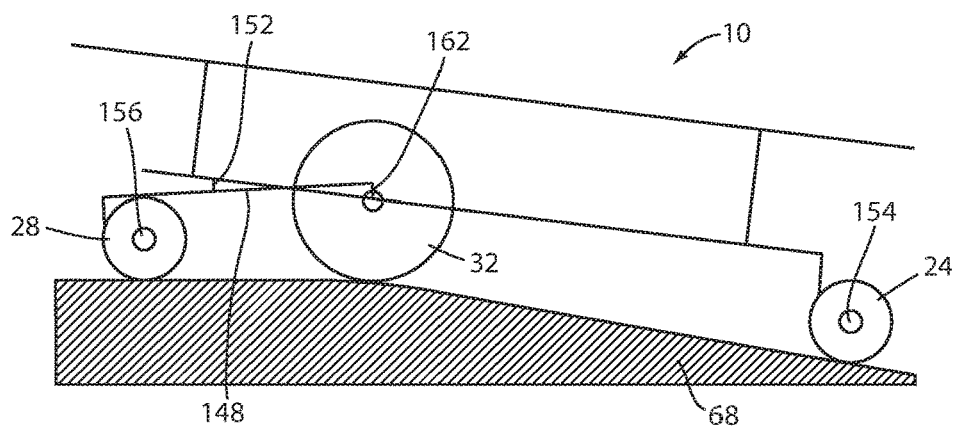
FIG. 4D is a side view of another embodiment of an auxiliary wheel support structure for the patient support apparatus illustrating the relationship between the auxiliary wheels and the floor surface in various positions.

For example, patient support apparatus 10 may include one or more actuators to raise the at least one auxiliary wheel between deployed position as shown in FIGS. 4C-4D and the non-engaged position shown in FIG. 4B. The actuator may comprise a manually operable actuator or a powered actuator, including an electric, pneumatic, or hydraulic actuator, for raising the auxiliary wheel such that the actuator raises the auxiliary wheel a distance in a range of 0 to 150 mm above the floor surface when the auxiliary wheel is moved to its non-engaged position.

Should the patient support apparatus encounter an inclined plane or other uneven floor surface as illustrated in FIGS. 4C and 4D, the suspension beam 148 pivots about intermediate pivot axis 152 such that the auxiliary wheel 32 and caster wheel 28 continue to maintain engagement the floor surface 68. By maintaining contact with the floor surface, the suspension mechanism allows the auxiliary wheels to continue to operate and reduces issues such unexpected acceleration, loss of stability or patient discomfort. The at least one auxiliary wheel supported by the suspension mechanism may apply a pressure to the floor surface greater than the pressure applied to the floor surface by its associate caster wheel.

As noted above, auxiliary wheels 32, 34 of the patient support apparatus 10 may be moved to a non-engaged position, for example, when a turn is desired. To place the auxiliary wheels 32, 34 into their non-engaged position, apparatus 10 may include one or more actuators. Because the wheels need only be lifted out of engagement with the floor 68, the distance wheels 34, 36 need be raised can be small, for example in a range of 0 to 150 mm, for example. For example, apparatus 10 may include a handle that is coupled to shaft, which supports a cam. When the handle is rotated, the shaft will rotate the cam. The cam may be located under the shaft of the auxiliary wheel so that when the lobe of the cam is raised, the shaft and the auxiliary wheel or wheels will be lifted. Optionally, the handle may include a torsional spring to provide an assist and reduce the torque required to turn the handle. In another embodiment, the shaft may be coupled to foot pedals 54, 56, which when suppressed rotate the shaft 58. The shaft 58 may include a crank arm that rotates the cam.

As noted above, powered actuators may be used. For example, apparatus 10 may include one or more linear motors or gas or hydraulic cylinders that are supported on base 12 and are coupled to the auxiliary wheel assembly to thereby extend or contract to raise or lower the auxiliary wheels.

Optionally, as noted above, wheels 32, 34 may be powered and further be controlled by a sensor based control system operated through handles 38a, 38b. An end rail or any other known gripping type device that enables persons to move or push the patient support apparatus 10 can replace the handles 38a, 38b. Even the frame of the patient support apparatus can be utilized as the gripping device in some embodiments. Suitable sensors can include the sensors disclosed in U.S. Pat. No. 6,772,850, issued Aug. 10, 2004, and titled POWER ASSISTED WHEELED CARRIAGE, the disclosure of which is hereby incorporated by reference in its entirety.

As noted above, a control apparatus for the braking systems employed herein may include manually engaged members, such as foot pedals 54, 56 provided at opposing ends of a rotatable shaft 58, which is rotatably mounted to the base 12. The pedals 54, 56 may have multiple settings, including a setting to brake the catered wheel brakes, the optional auxiliary wheel brake, or adjust the position of the auxiliary wheels 32, 34. It is also contemplated that one or more side pedals 60 can also set a brake, adjust the position of the auxiliary wheels 32, 34, or control the height of the patient support 14 by controlling the hydraulic jacks 16, 18. The pedal arrangement may have share some common features with the pedals disclosed in U.S. Pat. No. 6,240,579, issued Jun. 5, 2001 and titled UNITARY PEDAL CONTROL OF BRAKE AND FIFTH WHEEL DEPLOYMENT VIA SIDE AND END ARTICULATION WITH ADDITIONAL UNITARY PEDAL CONTROL OF HEIGHT OF PATIENT SUPPORT, which is hereby incorporated by reference in its entirety herein.

While exemplary embodiments are described above, it is not intended that these embodiments are limiting. Rather, the words used in the specification are words of description rather than limitation, and it is understood that various changes may be made without departing from the spirit and scope of the disclosure. Additionally, the features of various implementing embodiments may be combined to form further embodiments of the disclosure.

I claim:

1. A patient support apparatus comprising:
a base having a first end, a second end opposed to the first end, opposed sides, and a length extending between the first end and the second end, the base including a plurality of caster wheels enabling movement of the patient support apparatus across a floor surface, a first pair of spaced apart independent caster wheels of the plurality of caster wheels mounted at or adjacent the first end of the base at the opposed sides of the base and a second pair of spaced apart independent caster wheels of the plurality of caster wheels mounted at or adjacent the second end at the opposed sides of the base;
a support structure secured to the base and rotatably supporting at least one non-castered auxiliary wheel about a rotational axis transverse to the length of the base for engagement with the floor surface, the support structure pivotally mounted relative to the base about a pivot axis and configured to support the auxiliary wheel and to enable movement of the auxiliary wheel out of engagement with the floor surface to a non-engaged position wherein the at least one auxiliary wheel is out of engagement with the floor surface; and
at least one pair of caster wheels of the first and second pairs of caster wheels mounted to the support structure.

2. The patient support apparatus of claim 1, further comprising a brake, said brake associated with the auxiliary wheel.

3. The patient support apparatus of claim 1, further comprising a drive mechanism configured to drive the auxiliary wheel, optionally the drive mechanism comprises a motor.

4. The patient support apparatus of claim 1, further comprising a control apparatus for moving the auxiliary wheel to the non-engaged position, wherein when the auxiliary wheel is engaged with the floor surface, each of the caster wheels and the auxiliary wheel are all in contact with the floor surface.

5. The patient support apparatus of claim 4, wherein the patient support has a center of gravity and the auxiliary wheel is offset toward the first end or the second end of the base from the center of gravity.

6. The patient support apparatus of claim 1, wherein each caster wheel has a caster wheel rotational axis and a swivel axis, the caster wheel rotational axes and the swivel axes forming a rectangular foot print, and the auxiliary wheel being located within and spaced inwardly of the rectangular foot print.

7. The patient support apparatus of claim 1, wherein the auxiliary wheel comprises a first auxiliary wheel and a second auxiliary wheel, the second auxiliary wheel being parallel to the first auxiliary wheel and being rotatable about the rotational axis.

8. The patient support apparatus of claim 7, wherein when engaged with the floor surface, each of the caster wheels and each of the first and second auxiliary wheels are all in contact with the floor surface.

9. The patient support apparatus of claim 1, wherein the support structure is mounted to the base by an articulating mount, the support structure supporting the auxiliary wheel at a distance R1 from the articulating mount and supporting the associated caster wheels at a distance R2 from the articulating mount wherein R1 is or is not equal to R2.

10. A patient support apparatus comprising:
a base having a length and including a plurality of caster wheels enabling movement of the patient support apparatus across a floor surface;
a support structure secured to the base and rotatably supporting at least one non-castered auxiliary wheel about a rotational axis transverse to the length of the base for engagement with the floor surface, the support structure configured to support the auxiliary wheel and to enable movement of the auxiliary wheel out of engagement with the floor surface to a non-engaged position wherein the auxiliary wheel is out of engagement with the floor surface, wherein the auxiliary wheel and an associated caster wheel of the plurality of caster wheels are mounted to the support structure, the support structure mounted to the base by an articulating mount, the support structure supporting the auxiliary wheel at a distance R1 from the articulating mount and supporting the associated caster wheel at a distance R2 from the articulating mount wherein R1 is greater than R2.

11. The patient support apparatus of claim 1, wherein said support structure includes a damper to absorb movement of the auxiliary wheel when the auxiliary wheel encounters variation in terrain of the floor surface.

12. A patient support apparatus comprising:
a base having a first end, a second end, and a length extending from the first end to the second end, and the base including a plurality of caster wheels spaced from one another on the base to engage a floor surface to enable movement of the patient support apparatus across the floor surface, and the patient support having a center of gravity extending through the base;
first and second auxiliary wheels, the second auxiliary wheel being parallel to the first auxiliary wheel and being rotatable about a rotational axis offset from the center of gravity wherein the auxiliary wheels are located toward the first end or the second end of the base;
a support structure configured to support the auxiliary wheels and to enable movement of the auxiliary wheels between a non-engaged position wherein the auxiliary wheels are out of engagement with the floor surface and in a deployed position wherein the auxiliary wheels are in engagement with the floor surface; and
a suspension member pivotally mounted to the base, the suspension member having a first end and a second end, an associated caster wheel of the plurality of caster wheels disposed on the first end of the suspension member, the auxiliary wheels disposed on the second end of the suspension member, and the suspension member being pivotal relative to the base to accommodate a changing terrain of the floor surface wherein the auxiliary wheels and the associated caster wheel maintain contact with and follow the changing terrain of the floor surface.

13. The patient support apparatus of claim 12, further comprising a brake, said brake associated with the auxiliary wheels.

14. The patient support apparatus of claim 12, further comprising a drive mechanism configured to drive the auxiliary wheels.

15. The patient support apparatus of claim 12, wherein the plurality of caster wheels include a head end caster wheel and a foot end caster wheel, each caster wheel having a caster wheel rotational axis and a swivel axis, and the auxiliary wheel being located between the axes of rotation of the head end caster wheel and the foot end caster wheel.

16. The patient support apparatus of claim 12, wherein the plurality of caster wheels include a head end caster wheel and a foot end caster wheel, each caster wheel having a caster wheel rotational axis and a swivel axis, the caster wheel axes of rotation and swivel axes defining a foot print, and the auxiliary wheel being located outside the foot print.

17. The patient support apparatus of claim 12, wherein when engaged with the floor surface the auxiliary wheels are supported to apply a pressure to the floor surface greater than the pressure applied to the floor surface by the associated caster wheel.

18. The patient support apparatus of claim 17, wherein the auxiliary wheels and the associated caster wheel are mounted on the support structure, the support structure mounted to the base by an articulating mount, the support structure supporting the auxiliary wheels at a distance R1 from the articulating mount and supporting the associated caster wheel at a distance R2 from the articulating mount wherein R1 is not equal to R2.

19. A patient support apparatus comprising:
a base having a length and including a plurality of caster wheels spaced from one another on the base to engage a floor surface to enable movement of the patient support apparatus across the floor surface;
first and second auxiliary wheels, the second auxiliary wheel being parallel to the first auxiliary wheel and being rotatable about a rotational axis;
a support structure configured to support the auxiliary wheels and to enable movement of the auxiliary wheels between a non-engaged position wherein the auxiliary wheels are out of engagement with the floor surface and a deployed position where the auxiliary wheels are in engagement with the floor surface;
wherein the support structure comprises a suspension member pivotally mounted to the base, the suspension member having a first end and a second end, an associated pair of caster wheels of the plurality of caster wheels disposed on the first end of the suspension member, the auxiliary wheels disposed on the second end of the suspension member, and the suspension member being pivotal relative to the base to accommodate a changing terrain of the floor surface wherein the auxiliary wheels and the associated caster wheels maintain contact with and follow the changing terrain of the floor surface, and when engaged with the floor surface the auxiliary wheels supported to apply a pressure to the floor surface greater than the pressure applied to the floor surface by the associated caster wheels, the support structure mounted to the base by an articulating mount, the support structure supporting the auxiliary wheels at a distance R1 from the articulating mount and supporting the associated caster wheels at a distance R2 from the articulating mount, wherein R1 is greater than R2.

* * * * *